UNITED STATES PATENT OFFICE.

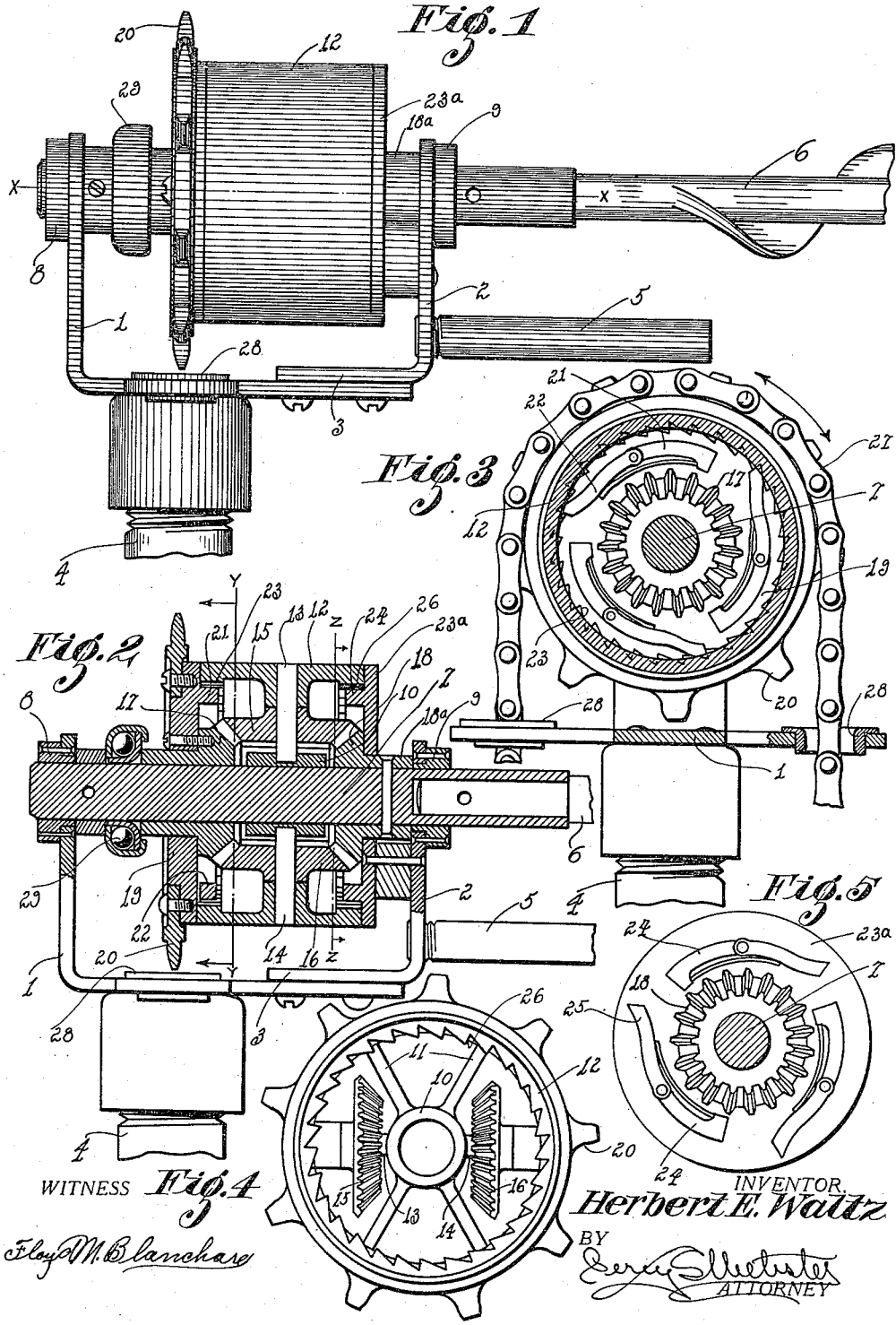

HERBERT E. WALTZ, OF STOCKTON, CALIFORNIA.

OPERATING MECHANISM FOR BORING-MACHINES.

1,176,185.  Specification of Letters Patent.  Patented Mar. 21, 1916.

Application filed June 30, 1915. Serial No. 37,197.

*To all whom it may concern:*

Be it known that I, HERBERT E. WALTZ, a citizen of the United States, residing at Stockton, in the county of San Joaquin, State of California, have invented certain new and useful Improvements in Operating Mechanism for Boring-Machines; and I do declare the following to be a clear, full, and exact description of the same, reference being had to the accompanying drawings, and to the characters of reference marked thereon, which form a part of this application.

This invention relates to improvements in implements, tools and machines wherein it is desirable to convert rotary motion in alternate directions into a continuous rotary motion in one direction, particularly in connection with boring machines used especially by electricians for boring holes through building structures for the purpose of installation of wires, the object of the invention being to produce a tool by the use of which the operator may bore holes in partly inaccessible and awkward places in a rapid manner and with ease and efficiency.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the complete structure. Fig. 2 is a sectional view taken on a line X—X of Fig. 1. Fig. 3 is a sectional view taken on a line Y—Y of Fig. 2. Fig. 4 is an end view of the operating mechanism with a portion of the gears and other structure removed. Fig. 5 is a sectional view taken on a line Z—Z of Fig. 2.

Referring now more particularly to the characters of reference on the drawings, I first provide a frame consisting of two angle members 1 and 2, respectively, connected together, as at 3, for the purpose of readily disassembling the structure of the tool. On the member 1 is a support 4 and on the member 2 is a projecting stop member 5 adapted to limit the movement of the auger 6. In applying my motion converting means to boring machines, I provide a central driven shaft 7 into which the auger 6 may be suitably fastened. This shaft 7 operates in suitable bearings 8 and 9 mounted on the members 1 and 2, respectively.

Mounted centrally on the shaft 7 is a bearing 10 having a plurality of projecting arms 11 supporting an outer sleeve 12. Projecting from opposite sides of the sleeve 12 are two pins 13 and 14, respectively, which anchor into the bearing 10. Mounted on the pin 13 is a beveled gear 15 and on the pin 14 is a beveled gear 16. Mounted on the shaft 7 are two gears 17 and 18 intermeshing with the gears 15 and 16. The gear 17 is turnable on the shaft 7, while the gear 18 is secured to and turnable with said shaft 7.

Secured to the gear 17 in any suitable manner is a disk 19 carrying a sprocket 20. Projecting inwardly from the inner face of the disk 19 are a plurality of lugs 21 pivotally mounted to each of which is a spring pressed dog 22. These dogs 22 engage a ratchet rack 23 on the inner circumference of the sleeve 12 at the end adjacent the said disk 19. On the opposite end of the sleeve 12 is a disk 23$^a$ rigidly secured to the member 2 and surrounding a hub 18$^a$ of the gear 18, whereby the gear 18 can be turned independently of the said disk 23$^a$. On the disk 23$^a$ are a plurality of inwardly projecting lugs 24 pivotally mounted to each of which are spring pressed dogs 25. These dogs 25 engage a ratchet rack 26 on the inner circumference of the sleeve 12 on the end adjacent the disk 23$^a$.

A sprocket chain 27 is mounted on the sprocket wheel 20 and projects through openings 28 suitably mounted on the member 1.

When it is desired to operate the machine, the operator, by means of the support 4, holds the auger 6 adjacent the point at which the hole is to be bored and then by pulling the chain 27 in either direction, this will cause the auger 6 to move in one direction to advance itself into the material in which the hole is to be bored. This continuous advancement of the auger 6 is accomplished as follows, namely: When the chain 27 is operated to drive the sprocket 20 in a counterclockwise direction as indicated by the arrow in Fig. 3, this causes the dogs 22 to engage the ratchet rack 23 and to move the sleeve 12 as a unit with said sprocket wheel 20 and this action causes all the gears to move likewise as a unit and since the gear 18 is secured to the shaft 7, this will impart the same motion to the shaft 7 and incidentally to the auger 6. When however, the sprocket 20 is moved in a clockwise direction, the dogs 22 override the ratchet rack 21 while the dogs 25 engage the ratchets 26 and hold the sleeve 12 against motion. Thus, since the sprocket wheel 20 is connected to the gear 17, such gear 17 will act to rotate the gears 15 and 16 and the gear 18, which action will move the said shaft 7 in a counter-clockwise movement causing the auger 6 to be moved in the same direction as before. Thus it will be seen that no matter in what direction the operator of the implement may pull the chain 27, the auger 6 will be advanced to perform its function.

The numeral 29 designates ball bearings arranged on the shaft 7 to take up the end thrust of the gear structure shown.

While I have shown herein the application of the device to the one particular form of machine, still it is apparent that it may be used in connection with other devices where the motion change is desirable.

From the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. The combination with a shaft, of a driven member rotatable on the shaft, a beveled gear on such driven member, another beveled gear fixed to the shaft, an independent member, beveled gears journaled on the independent member and engaging both of said first named beveled gears, means for engaging the driven member with such independent member when the driven member rotates in one direction, and means for holding the independent member stationary when the driven member rotates in the opposite direction, as described.

2. The combination with a shaft, of a driven member rotatable on the shaft, a beveled gear fixed to the driven member, another beveled gear fixed to the shaft, a sleeve mounted independently of the first named members, beveled gears journaled on the sleeve and engageable with the first named beveled gears, internal ratchets at each end of the sleeve, dogs mounted on the driven member and engageable with the ratchets at one end of the sleeve when the driven member rotates in one direction, and stationary dogs engageable with the ratchets in the other end of the sleeve to hold the sleeve against motion when the driven member rotates in an opposite direction, as described.

3. The combination with a shaft, of a bearing mounted on the shaft, projecting arms on the bearing, a sleeve mounted on the arms, beveled gears journaled on the sleeve in opposed relation, a beveled gear fixed on the shaft and engaging the first named beveled gears, another beveled gear rotatable on the shaft and engaging the first named beveled gears, a driven member on the last named beveled gear, means for engaging the driven member with the sleeve when the driven member rotates in one direction, and means for holding the sleeve stationary when the driven member rotates in the opposite direction, as described.

In testimony whereof I affix my signature in presence of two witnesses.

HERBERT E. WALTZ.

Witnesses:
FLOYD M. BLANCHARD,
MABEL G. BOARD.